US012635041B2

(12) United States Patent
Wiswall et al.

(10) Patent No.: US 12,635,041 B2
(45) Date of Patent: May 19, 2026

(54) METHODS OF COOLING AN ELECTRICALLY CONDUCTIVE SHEET DURING TRANSVERSE FLUX INDUCTION HEAT TREATMENT

(71) Applicant: Arconic Inc., Pittsburgh, PA (US)

(72) Inventors: James Wiswall, Pittsburgh, PA (US); John A. Anderson, San Antonio, TX (US); Ming M. Li, Murrysville, PA (US); Gavin F. Wyatt-Mair, Lafayette, CA (US)

(73) Assignee: Arconic Technologies LLC, Pittsburgh, PA (US)

( * ) Notice: Subject to any disclaimer, the term of this patent is extended or adjusted under 35 U.S.C. 154(b) by 703 days.

(21) Appl. No.: 15/779,779

(22) PCT Filed: Dec. 5, 2016

(86) PCT No.: PCT/US2016/064988
§ 371 (c)(1),
(2) Date: May 29, 2018

(87) PCT Pub. No.: WO2017/096387
PCT Pub. Date: Jun. 8, 2017

(65) Prior Publication Data

US 2020/0305242 A1 Sep. 24, 2020

Related U.S. Application Data

(60) Provisional application No. 62/263,489, filed on Dec. 4, 2015.

(51) Int. Cl.

| | |
|---|---|
| ***H05B 6/10*** | (2006.01) |
| ***C21D 1/42*** | (2006.01) |
| ***C21D 9/56*** | (2006.01) |

(52) U.S. Cl.
CPC .............. *H05B 6/101* (2013.01); *C21D 1/42* (2013.01); *C21D 9/561* (2013.01)

(58) Field of Classification Search
None
See application file for complete search history.

(56) References Cited

U.S. PATENT DOCUMENTS

| | | |
|---|---|---|
| 3,367,639 A | 2/1968 | Bock |
| 3,718,024 A | 2/1973 | Vitelli |

(Continued)

FOREIGN PATENT DOCUMENTS

| | | |
|---|---|---|
| EP | 1359230 A1 | 11/2003 |
| JP | S60-92428 A | 5/1985 |

(Continued)

OTHER PUBLICATIONS

R. Waggott et al., "Transverse flux induction heating of aluminium alloy strip" in *Heat Treatment* '81, The Metals Society, pp. 3-9, 1983.

(Continued)

*Primary Examiner* — Edward F Landrum
*Assistant Examiner* — Thomas J Ward
(74) *Attorney, Agent, or Firm* — Greenberg Traurig, LLP

(57) ABSTRACT

The present invention, in some embodiments, is a method the includes obtaining a sheet of a non-ferrous alloys as feedstock having a first edge and a second edge, heating the feedstock using a transverse flux induction heating system to form a heat treated product and concomitant with the heating step, cooling at least one of the first edge and the second edge of the feedstock by cross-flowing at least one fluid across the at least one of the first edge and the second edge of the feedstock.

11 Claims, 9 Drawing Sheets

(56) References Cited

U.S. PATENT DOCUMENTS

| | | | | | |
|---|---|---|---|---|---|
| 3,744,963 | A | 7/1973 | Flynn | | |
| 3,821,037 | A * | 6/1974 | Snyder | C21D 1/84 | 148/572 |
| 4,142,923 | A * | 3/1979 | Satava | C21D 1/42 | 148/575 |
| 4,243,441 | A * | 1/1981 | Wilson | C21D 9/56 | 148/508 |
| 4,371,149 | A * | 2/1983 | Takeuchi | C21D 1/667 | 266/113 |
| 4,412,923 | A | 11/1983 | Capitani et al. | | |
| 4,448,401 | A | 5/1984 | Jalil et al. | | |
| 4,714,500 | A | 12/1987 | Heller et al. | 148/12 R | |
| 5,350,467 | A * | 9/1994 | Evans | B65G 47/1407 | 148/252 |
| 6,264,767 | B1 * | 7/2001 | Frank | B21B 1/34 | 148/547 |
| 6,570,141 | B2 | 5/2003 | Ross | | |
| 6,874,344 | B1 * | 4/2005 | Junius | B21B 1/36 | 72/201 |
| 6,963,056 | B1 | 11/2005 | Peysakhovich et al. | | |
| 8,881,568 | B2 | 11/2014 | Nakata et al. | | |
| 2002/0017344 | A1 * | 2/2002 | Gupta | C22F 1/05 | 148/551 |
| 2002/0102355 | A1 * | 8/2002 | Levendusky | B05D 1/265 | 427/318 |
| 2004/0217184 | A1 * | 11/2004 | Seidel | B21B 27/10 | 239/8 |
| 2009/0108508 | A1 * | 4/2009 | Ueoka | B21B 45/0218 | 266/44 |
| 2009/0320546 | A1 * | 12/2009 | Seidel | C21D 11/00 | 72/200 |
| 2014/0250963 | A1 * | 9/2014 | Nelson | B21B 45/0209 | 72/12.7 |
| 2015/0257207 | A1 | 9/2015 | Akers | | |

FOREIGN PATENT DOCUMENTS

| | | | |
|---|---|---|---|
| JP | S61-113722 | | 5/1986 |
| JP | 2002-317227 | A | 10/2002 |
| WO | 2014/121778 | A1 | 8/2014 |

OTHER PUBLICATIONS

International Search Report and Written Opinion dated Feb. 15, 2017, issued by the U.S. Patent and Trademark Office in International Application No. PCT/US16/064988 (15 pages).

Taguchi, K et al., “Recent Induction Heating Device”, Fuji Electric Journal, 68(4), 1995, translated. Original Japanese reference attached.

ANSI H35.1/H35.1(M)-2009 “American National Standard Alloy and Temper Designation Systems for Aluminum”, The Aluminum Association—2009, 13 Pages.

* cited by examiner

METHODS OF COOLING AN ELECTRICALLY CONDUCTIVE SHEET DURING TRANSVERSE FLUX INDUCTION HEAT TREATMENT

TECHNICAL FIELD

The present invention relates to cooling of a non-ferrous alloy sheet during transverse flux induction heat treatment.

BACKGROUND

Transverse flux induction heat treatment is known.

SUMMARY OF INVENTION

In an embodiment, the present invention is a method comprising obtaining a sheet as feedstock, wherein the sheet is a non-ferrous alloy, and wherein the feedstock has a first edge and a second edge; heating the feedstock using a transverse flux induction heating system to form a heat treated product; concomitant with the heating step, cooling at least one of the first edge and the second edge of the feedstock by cross-flowing at least one fluid across the at least one of the first edge and the second edge of the feedstock.

In one or more embodiment detailed herein, the at least one fluid is at least one of helium, hydrogen, or air. In one or more embodiment detailed herein, the at least one fluid is air. In one or more embodiment detailed herein, the air further comprises water vapor.

In one or more embodiment detailed herein, the air further comprises liquid water droplets. In one or more embodiment detailed herein, the non-ferrous alloy is selected from the group consisting of aluminum alloys, magnesium alloys, titanium alloys, copper alloys, nickel alloys, zinc alloys and tin alloys.

In one or more embodiment detailed herein, the non-ferrous alloy is an aluminum alloy selected from the group consisting of 1xxx, 2xxx, 3xxxx, 4xxx, 5xxx, 6xxx, 7xxx, and 8xxx series aluminum alloys defined by the American National Standard Alloy Temper and Designation Systems for Aluminum (ANSI H35.1, 2009) maintained by the Aluminum Association Inc. in North America. In one or more embodiment detailed herein, the aluminum alloy is selected from the group consisting of 2xxx, 5xxx, 6xxx, and 7xxx series aluminum alloys defined by the American National Standard Alloy Temper and Designation Systems for Aluminum (ANSI H35.1, 2009) maintained by the Aluminum Association Inc. in North America. In one or more embodiment detailed herein, the transverse flux induction heating system comprises a plurality of transverse flux induction heaters.

The method of any one of the preceding claims, wherein the cooling step is conducted between at least two of the plurality of transverse flux induction heaters.

The method of any one of the preceding claims, wherein the cooling step is conducted after the feedstock is heated by at least one of the plurality of transverse flux induction heaters.

The method of any one of the preceding claims, wherein the cooling step is conducted after the feedstock is heated by more than half of the plurality of transverse flux induction heaters.

Figure 1:
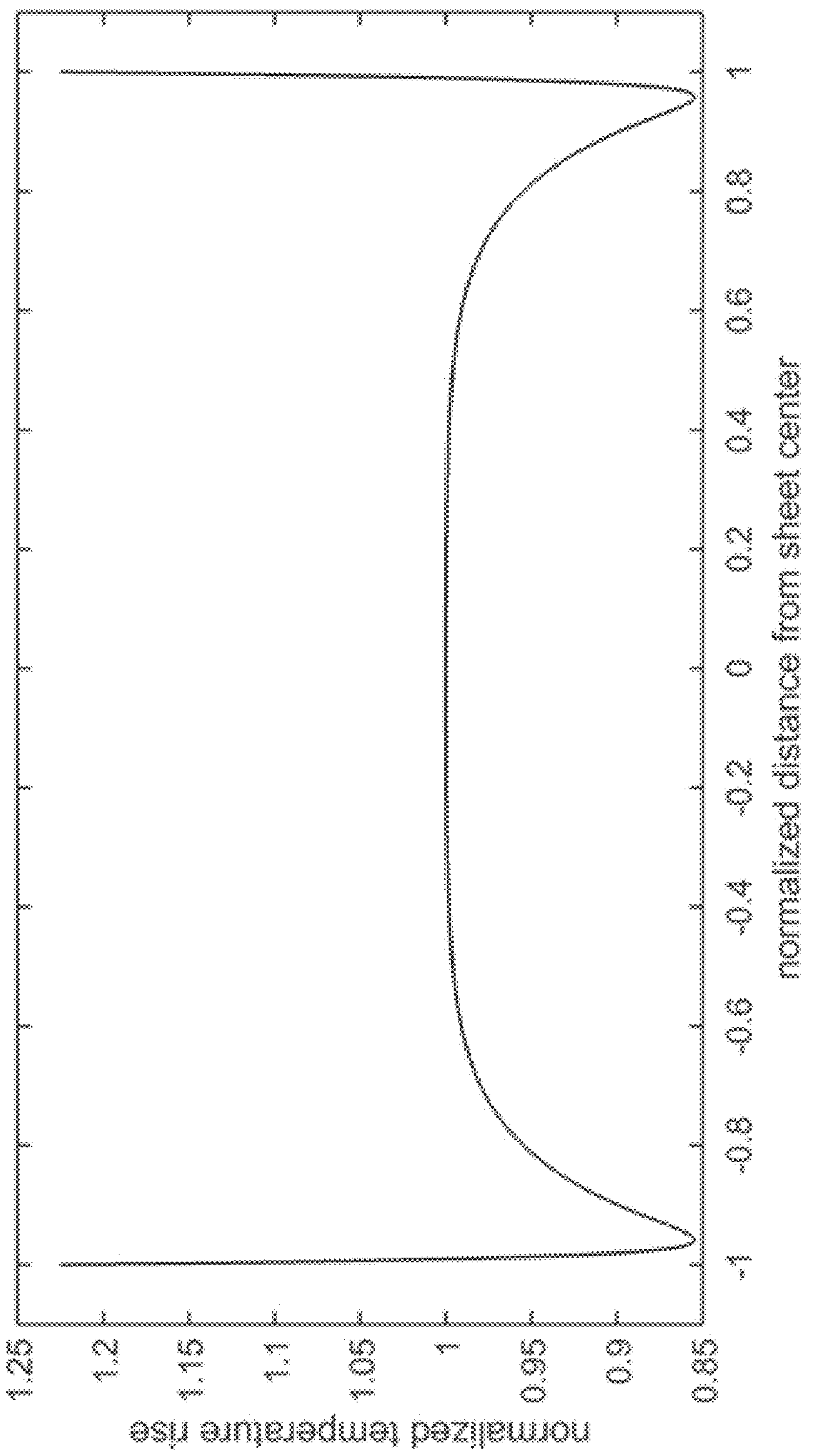
FIG. 1 illustrates a typical temperature profile across an induction heated sheet.

The present invention will be further explained with reference to the attached drawings, wherein like structures are referred to by like numerals throughout the several views. The drawings shown are not necessarily to scale or aspect ratio, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on.

In an embodiment, the present invention is a method comprising obtaining a sheet as feedstock, wherein the sheet is a non-ferrous alloy, and wherein the feedstock has a first edge and a second edge; heating the feedstock using a transverse flux induction heating system to form a heat treated product; concomitant with the heating step, cooling at least one of the first edge and the second edge of the feedstock by cross-flowing at least one fluid across the at least one of the first edge and the second edge of the feedstock.

In one or more embodiment detailed herein, the at least one fluid is at least one of helium, hydrogen, or air. In one or more embodiment detailed herein, the at least one fluid is air. In one or more embodiment detailed herein, the air further comprises water vapor.

In one or more embodiment detailed herein, the air further comprises liquid water droplets. In one or more embodiment detailed herein, the non-ferrous alloy is selected from the group consisting of aluminum alloys, magnesium alloys, titanium alloys, copper alloys, nickel alloys, zinc alloys and tin alloys.

In one or more embodiment detailed herein, the non-ferrous alloy is an aluminum alloy selected from the group consisting of 1xxx, 2xxx, 3xxxx, 4xxx, 5xxx, 6xxx, 7xxx, and 8xxx series aluminum alloys defined by the American National Standard Alloy Temper and Designation Systems for Aluminum (ANSI H35.1) maintained by the Aluminum Association Inc. in North America. In one or more embodiment detailed herein, the aluminum alloy is selected from the group consisting of 2xxx, 5xxx, 6xxx, and 7xxx series aluminum alloys defined by the American National Standard Alloy Temper and Designation Systems for Aluminum (ANSI H35.1, 2009) maintained by the Aluminum Association Inc. in North America. In one or more embodiment detailed herein, the transverse flux induction heating system comprises a plurality of transverse flux induction heaters.

The method of any one of the preceding claims, wherein the cooling step is conducted between at least two of the plurality of transverse flux induction heaters.

The method of any one of the preceding claims, wherein the cooling step is conducted after the feedstock is heated by at least one of the plurality of transverse flux induction heaters.

The method of any one of the preceding claims, wherein the cooling step is conducted after the feedstock is heated by more than half of the plurality of transverse flux induction heaters.

In embodiments, the present invention is a cooling method configured to reduce or eliminate edge overheating from heating electrically conductive sheet using transverse flux induction heaters in a continuous process. In some embodiments, the sheet may be formed of a non-ferrous alloy. In some embodiments, the non-ferrous alloy is selected from the group consisting of aluminum alloys, magnesium alloys, titanium alloys, copper alloys, nickel alloys, zinc alloys and tin alloys. In some embodiments, the non-ferrous alloy is an aluminum alloy selected from the group consisting of 1xxx, 2xxx, 3xxxx, 4xxx, 5xxx, 6xxx, 7xxx, and 8xxx series aluminum alloys defined by the American National Standard Alloy Temper and Designation Systems for Aluminum (ANSI H35.1, 2009) maintained by the Aluminum Association Inc. in North America.

As used herein, "sheet" may be of any suitable thickness, and is generally of sheet gauge (0.006 inch to 0.249 inch) or thin-plate gauge (0.250 inch to 0.400 inch), i.e., has a thickness in the range of 0.006 inch to 0.400 inch. However, thicker gauges exceeding 0.400 inch are also contemplated. In one embodiment, the sheet has a thickness of at least 0.040 inch. In one embodiment, the sheet has a thickness of no greater than 0.320 inch. In one embodiment, the sheet has a thickness of from 0.0070 to 0.018, such as when used for canning/packaging applications. In some embodiments, the sheet has a thickness in the range of 0.06 to 0.25 inch. In some embodiments, the sheet has a thickness in the range of 0.08 to 0.14 inch. In some embodiments, the sheet has a thickness in the range of 0.08 to 0.20 inch. In some embodiments, the sheet has a thickness in the range of 0.1 to 0.25 inches in thickness. The terms "strip", "sheet" and "plate" may be used interchangeably herein.

Edge overheating, when using transverse flux induction heaters, is typically caused by the inductor current loops extending beyond the edge of the sheet. This causes the induced current density within the sheet at the sheet edge to be locally high, and as the sheet passes between the inductor current loops, the edge also experiences a longer duration of the high current density than the interior portion of the sheet. Both of these phenomena may lead to overheated sheet edges. A non-limiting example of edge overheating is described in U.S. Pat. No. 6,576,878.

A non-limiting example of a typical temperature profile across the sheet width part way through an induction heating process determined using finite element modeling is shown in FIG. 1 for an aluminum alloy sheet. The variability in temperature increases for increasing heat input to the sheet.

Edge overheating creates variations in sheet product properties (e.g., yield strength, elongation, formability) near the sheet edge. Moreover, for some aluminum products, the target heat treatment temperature that exits the heating section is very near the solidus temperature of the aluminum products.

Figure 2:
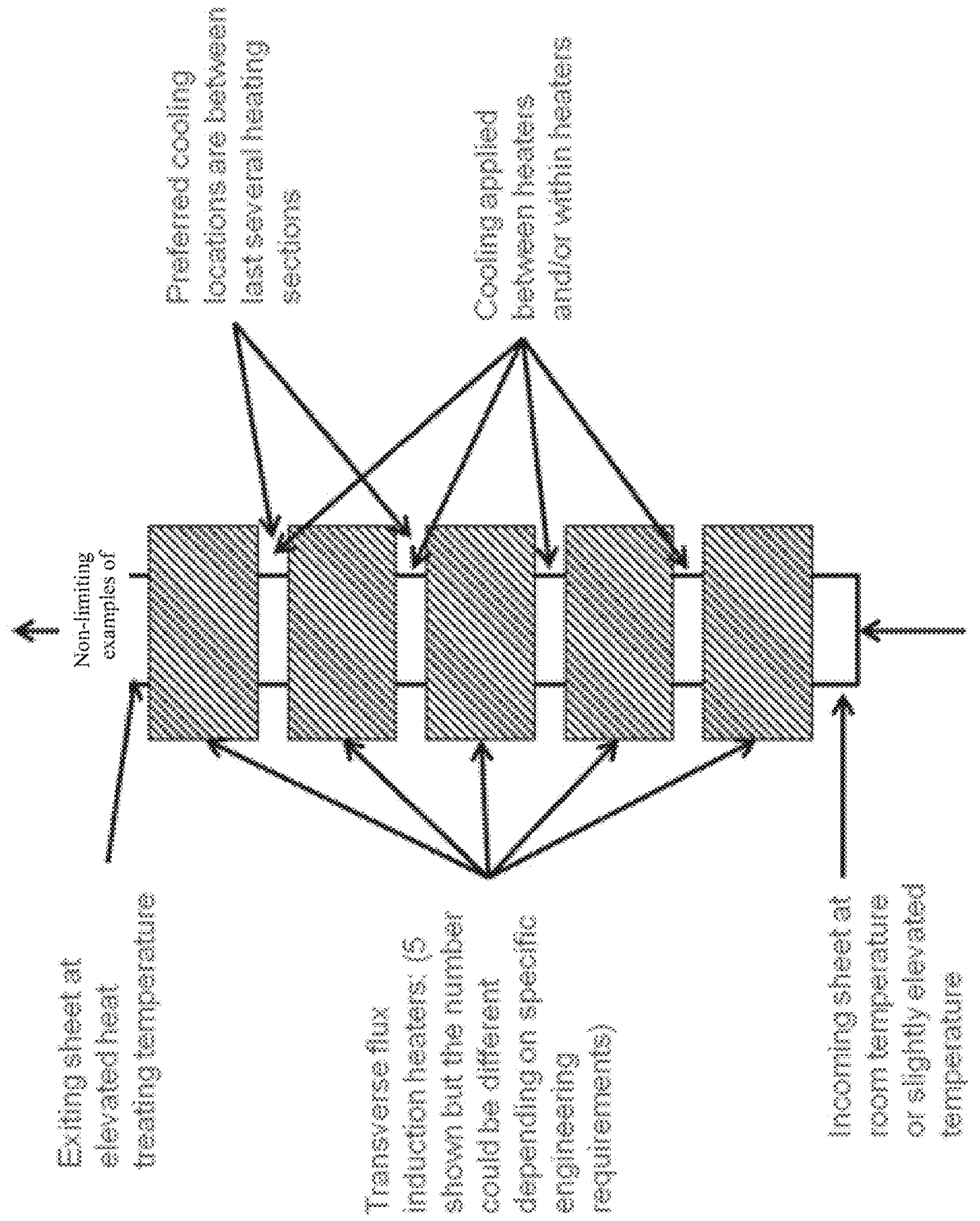
FIG. 2 illustrates a schematic of a transverse flux induction heating system.

A non-limiting example of the cooling method of embodiments of the present invention applied to a continuous transverse flux heat treating system is shown in FIG. 2. FIG. 2 illustrates a schematic of the heating portion of a continuous heat treatment system for sheet and/or plate using transverse flux induction heaters.

In an embodiment, the present method comprises cooling a non-ferrous alloy sheet sufficiently to reduce or eliminate edge overheating that occurs in a continuous transverse flux induction heating process. In some embodiments, the present invention comprises cooling a non-ferrous alloy sheet subjected to a continuous transverse flux induction heating process in-line with a casting process. In some embodiments, the casting process is a continuous casting process as described in U.S. Pat. Nos. 6,672,368, 7,125,612, 8,403,027, 7,846,554, 8,697,248, and 8,381,796 incorporated herein by reference in their entirety.

In some embodiments, the present invention comprises cooling a non-ferrous alloy sheet subjected to a continuous transverse flux induction heating process conducted off-line with sheet produced by a casting process. In some embodiments, the casting process is a continuous casting process as described in U.S. Pat. Nos. 6,672,368, 7,125,612, 8,403,027, 7,846,554, 8,697,248, and 8,381,796 incorporated herein by reference in their entirety. In some embodiments, the casting process is an ingot-based process such as direct chill casting.

In an embodiment, the cooling methods of the present invention result in a substantially uniform temperature across the width of the sheet.

In an embodiment, the method of the present invention integrates edge cooling with a transverse flux induction heat treating process for non-ferrous sheet to reduce or prevent edge overheating and/or edge melting. In an embodiment, the location of the edge cooling is prior to but near the exit of the heating process. In embodiments, the selection of the location of the edge cooling is based, at least in part, on 1) the effectiveness of the cooling as the sheet temperature increases due to an increasing driving force for heat transfer between the cooling air and sheet; 2) the cumulative edge overheating through the heating process; and 3) the occurrence of melting in the highest temperature region located at or near the exit of the heating process.

In embodiments, the present invention includes convection cooling. In other embodiments, the convection cooling is forced convection cooling. In some embodiments, the forced convection cooling is accomplished using at least one fluid. In an embodiment, the fluid is air. In yet other embodiments, the fluid may include gases other than air. In embodiments, the fluid may include water vapor and/or liquid water.

In some embodiments, the flow configurations to implement fluid cooling may include, but are not limited to, cross flow cooling (flow that is parallel to the plane of the sheet and directed toward the sheet centerline), and impinging jets at the sheet edge. As used herein, the term "cross-flowing" a fluid across a sheet and the like means flowing the fluid in a substantially parallel manner to the plane of the sheet toward the sheet centerline.

In embodiments, the cooling step is conducted between the heaters of the transverse flux induction heating device. In other embodiments, the cooling step is conducted integral with the heaters of the transverse flux induction heating device. In yet other embodiments, the cooling step is conducted nearer to the exit of the transverse flux induction heating device than the entrance.

Figure 3:
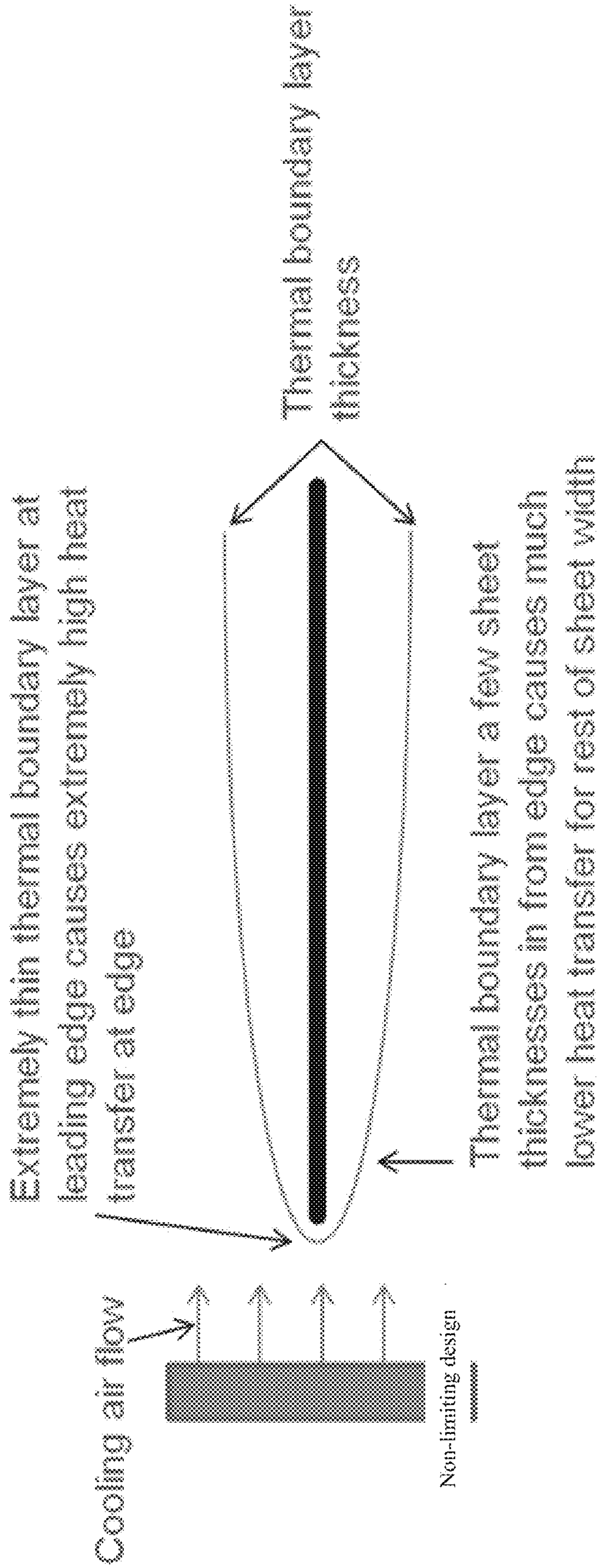
FIG. 3 illustrates features of cross-flow cooling a sheet edge.

In some embodiments, the present invention includes a cross flow fluid cooling configuration. In some embodiments, the fluid is air. In the embodiments, cross flow air cooling may be implemented along the edge of the sheet sufficiently to reduce edge overheating while slightly cooling the center portion of the sheet. In a non-limited example, a feature of the flow configuration is shown in FIG. 3 where a substantially higher heat transfer occurs at the sheet edge when compared with the center portion of the sheet due to a very thin thermal boundary layer at the edge of the sheet. FIG. 3 shows design features of cross-flow cooling to cool sheet edges while limiting heat from the center portion The following non-limiting example describes model and measurements for cross flow air cooling heat transfer using techniques described in Incropera, DeWitt, Bergman, Lavine, "Fundamentals of Heat and Mass Transfer" ("Incropera"). In the non-limiting example detailed herein, the flow impinging on the sheet edge was assumed to be fully turbulent flow because turbulent flow occurs in most industrial air delivery systems such as blowers and compressed air knives; however, laminar flow impinging on the sheet edge would have a similar effect and can also be modeled using different techniques described in Incropera.

Equations 1 and 2 model heat transfer for cross flow air cooling in a non-dimensional form. Dimensional values, such as heat transfer coefficient, can be calculated from Equations 1 and 2 by using the definitions of Nusselt number (Nu), Reynolds number (Re) and Prandtl number (Pr) and using the characteristic length, cooling fluid properties, and cooling fluid velocity.

Equation 1

$$Nu_t = 1.15\ \mathrm{Re}_t^{1/2} Pr^{1/3}. \tag{1}$$

Equation 2

$$Nu_x = 0.0296\ \mathrm{Re}_x^{4/5} Pr^{1/3}. \tag{2}$$

Figure 4:
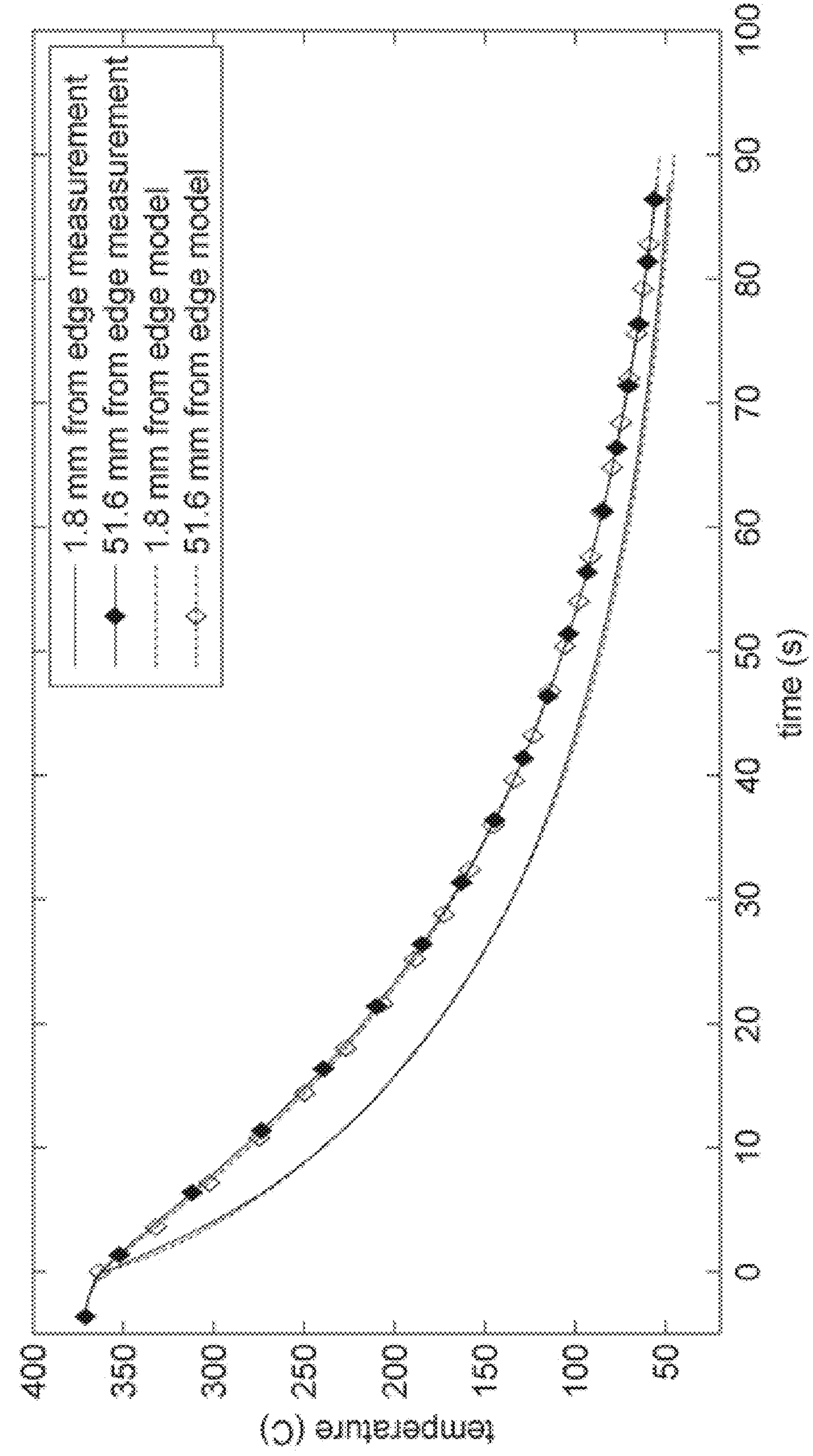
FIG. 4 illustrates modeling results on a 2.7 millimeter sample with 20 meters per second of cross flow.

Heat transfer at the sheet edge is described by Equation 1. In Equation 1, the characteristic length is the sheet thickness. Heat transfer from the top and bottom surfaces of the sheet as a function of distance from the edge is described by Equation 2. In Equation 2, the characteristic length is the distance from the sheet edge. Equation 2 tends toward infinity as distance from the edge tends toward 0; therefore, equation 1 was used to calculate Nu for the top and bottom surfaces at distances within one sheet thickness of the sheet edge. The heat transfer coefficients calculated from Equation 1 and 2 were used as a boundary condition for a computational heat conduction model of the sheet. Tests were conducted on a 2.7 mm thick sample at 20 m/s flow velocity to demonstrate the cooling effectiveness and to calibrate the heat transfer model. The model prediction compared with test data of the non-limiting example is shown in FIG. 4. The measurements shown in FIG. 4 are located 1.8 millimeters and 51.5 millimeters from the leading edge of the sheet.

For the turbulent flow non-limiting example described above, a desired cooling capacity can be achieved by using the convection heat transfer relationships in Equations 1 and 2 to estimate a cooling air flow velocity. In embodiments, the air flow velocity may be achieved using a blower. In other embodiments, the air flow velocity may be delivered using a low pressure blower delivering air at the specified velocity through an opening located close to the sheet edge to a high pressure slot nozzle with an exit flow velocity up to sonic velocity that is located at a distance from the edge where ambient air is entrained to achieve the specified velocity at the sheet edge. The model developed for the non-limiting example above can be used to specify a cooling system for a large range of sheet thickness, sheet speed, and heat treatment process conditions.

Figure 5:
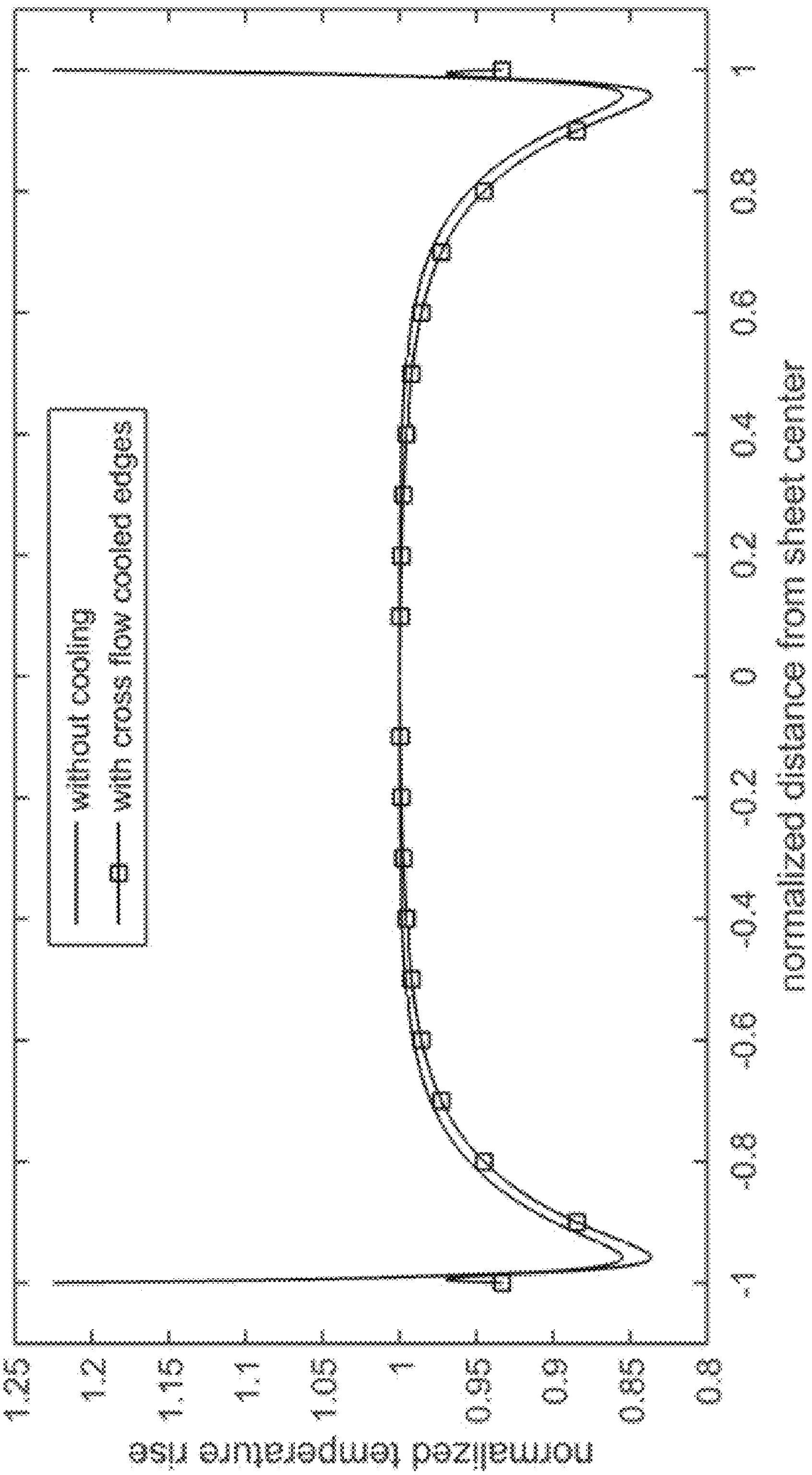
FIG. 5 illustrates the temperature profile of FIG. 1 compared with the temperature profile of cross-flow edge cooled inducted heated sheet.

FIG. 5 shows the effect of cooling on the typical edge overheated temperature profile shown in FIG. 1.

Figure 7:
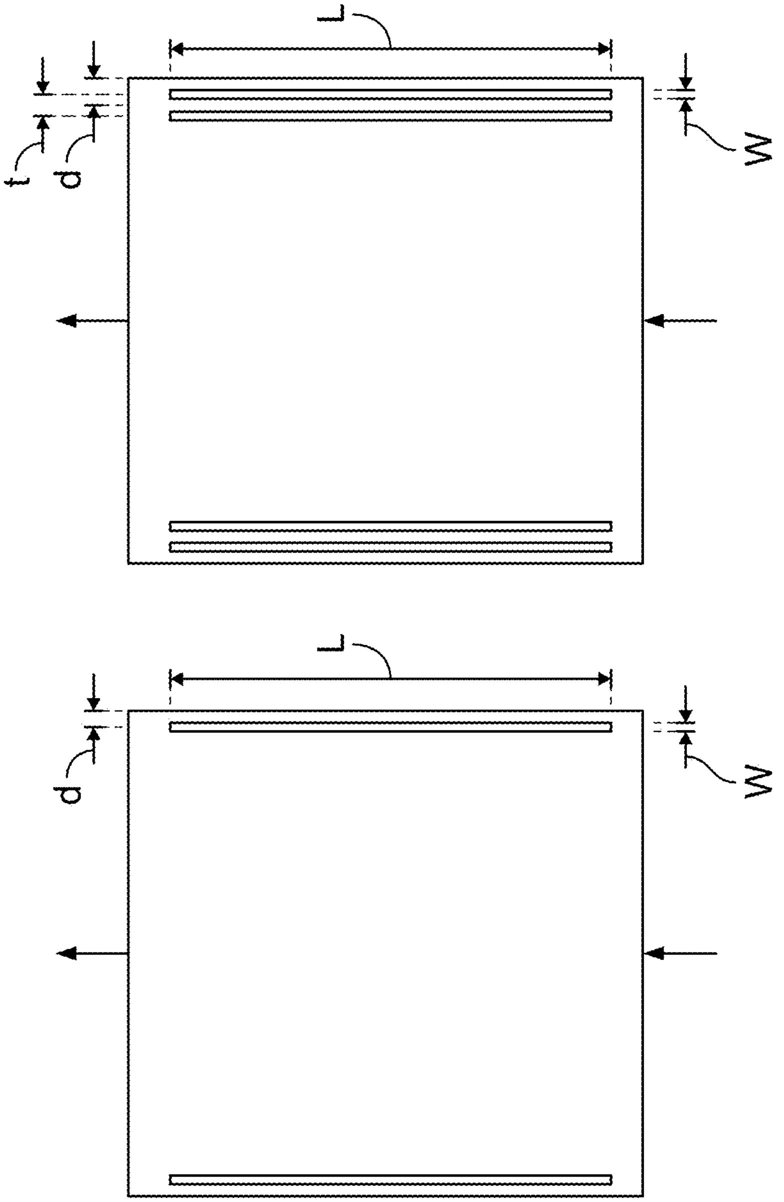
FIG. 7 illustrates non-limiting cooling nozzle configurations.
Figure 8:
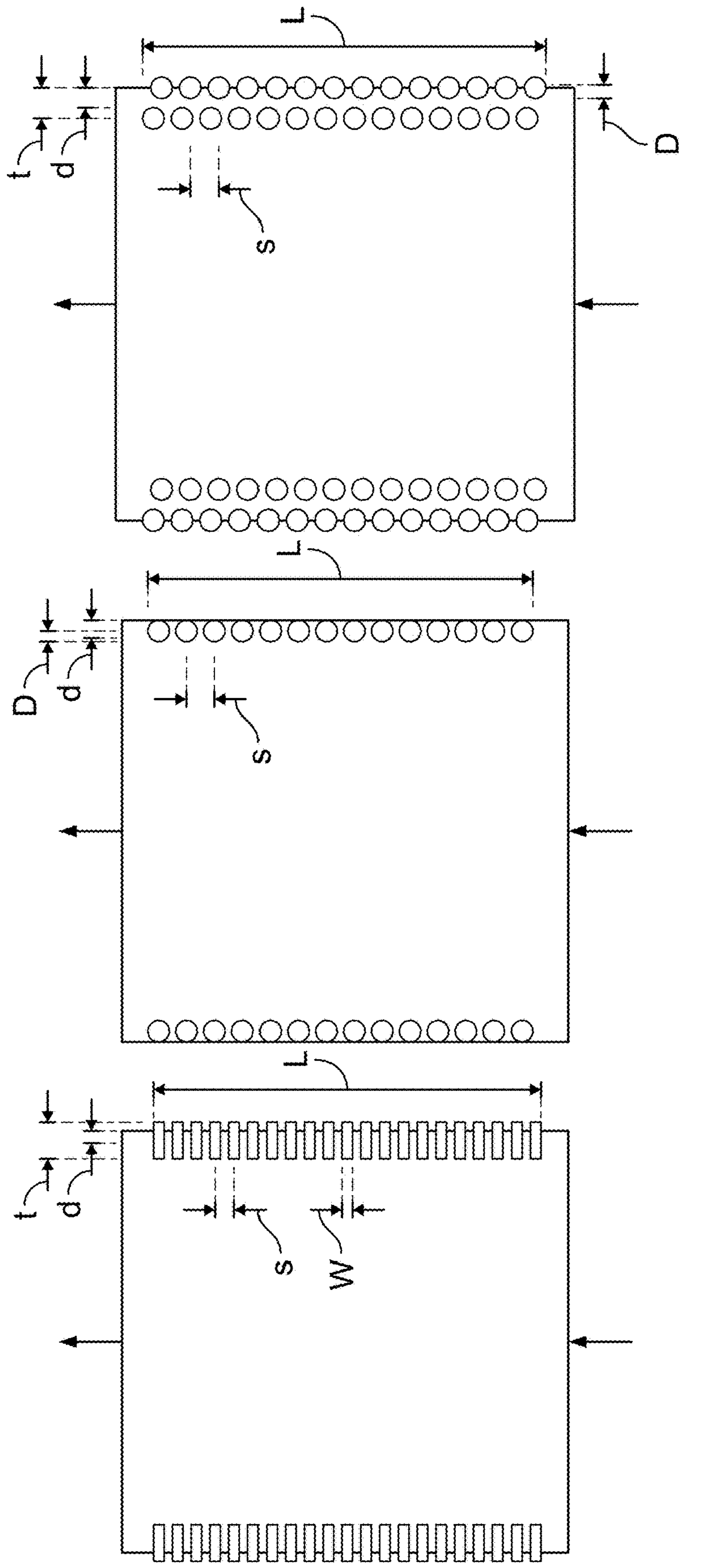
FIG. 8 illustrates non-limiting cooling nozzle configurations.

In some embodiments, the present invention includes an impinging jet cooling configuration. In embodiments, the impinging jets can also be used to cool the sheet edge and could be implemented as one slot, a slot array, a nozzle array, or combinations thereof. Non-limiting configurations of the jet cooling devices are shown in FIGS. 6, 7 and 8.

Figure 6:
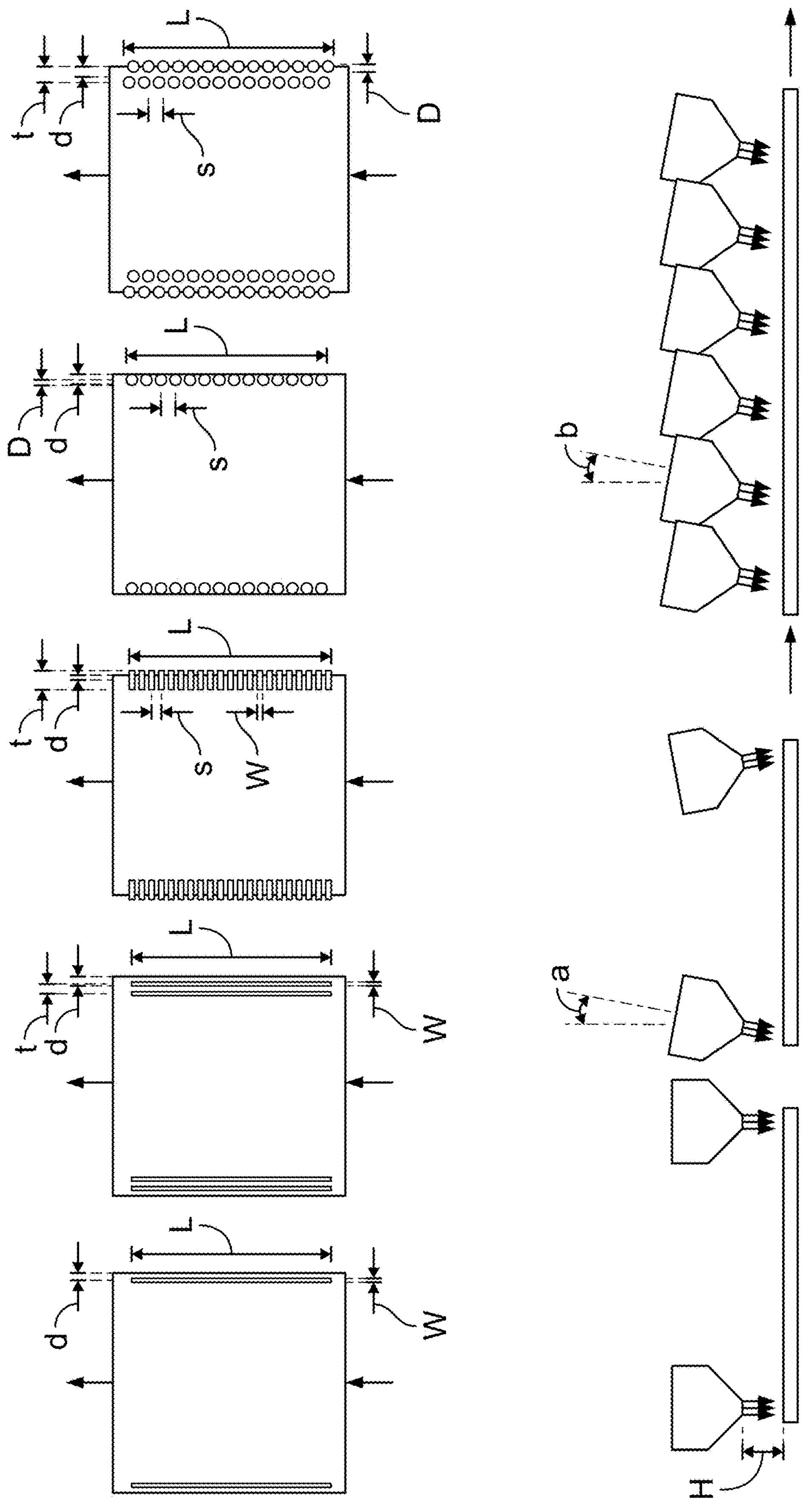
FIG. 6 illustrates non-limiting cooling nozzle configurations.

FIG. 6 illustrates several cooling nozzle configurations using slot nozzles, slot nozzle arrays, and round nozzle arrays. D is round nozzle diameter, W is slot nozzle width, s is nozzle to nozzle distance along sheet length, t is nozzle to nozzle distance along sheet width, d is nozzle array centerline distance from sheet edge, L is cooling length, H is the nozzle exit to sheet distance, a is the nozzle angle from vertical in plane perpendicular to sheet length direction, and b is the nozzle angel from vertical in the plane perpendicular to the sheet width direction. FIGS. 7 and 8 are expanded views of the non-limiting configurations shown in FIG. 6.

In a non-limiting example, based on known heat transfer correlations such as those detailed in N. Zuckerman and N. Lior, "Jet Impingement Heat Transfer: Physics, Correlations, and Numerical Modeling", Advances in Heat Transfer, Vol. 39, Pages 565-631, fluid cooling may be implemented using a single slot nozzle having a standoff distance between 25 and 100 mm (1 and 4 inches), a width between 2 and 10 mm (0.075 and 0.4 inches), and an average gas exit velocity between 10 and 300 m/s (30 and 1000 ft/s). In the non-limiting example, the heat transfer coefficient at the edge is between 110 and 1000 W/m2 K (20 and 180 BTU/hr ft2 F). Known heat transfer correlations may be used to determine nozzle geometry, spacing, and heat transfer for round nozzle arrays or slot nozzle arrays in the various configurations.

In some embodiments, the fluid flow delivered to the cooling jets is pulsed to alter the heat extracted from the sheet edge. In yet other embodiments, the nozzle is angled with respect to the sheet (with respect to either width, length or both) to alter the heat extracted and area over which heat is extracted.

Figure 9:
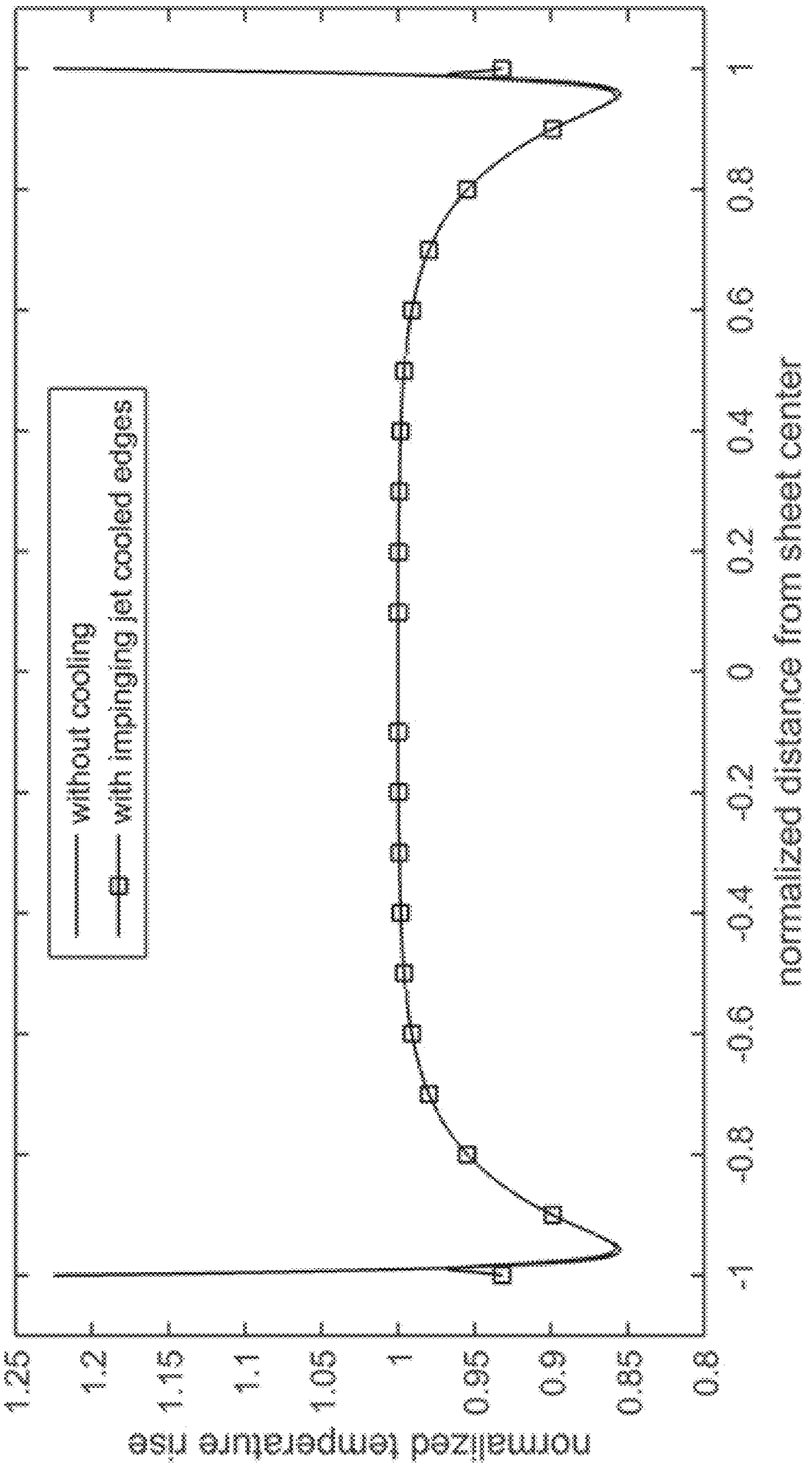
FIG. 9 illustrates a typical edge overheated profile and the modeled corrected temperature profile with edge cooling.

FIG. 9 shows the effect of using an impinging jet at the sheet edge on the typical edge overheated temperature profile shown in FIG. 1. FIG. 9 is a typical edge overheated profile and the modeled corrected temperature profile using impinging jets at the sheet edge as the sheet edge passes through a transverse flux induction heat treatment process.

In some embodiments, the impinging jet and/or cross flow fluid cooling methods detailed herein, the standoff distance between nozzles and the sheet edge may be modified based, at least in part, on the sheet width variance or moving of the sheet edge moves because of steering. In some embodiments, the cross flow fluid cooling method is less sensitive to sheet edge positioning than the impinging jet cooling method.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

We claim:

1. A method comprising:

(a) obtaining a sheet as feedstock,
wherein the sheet is a non-ferrous alloy, and
wherein the feedstock has a first edge and a second edge;
wherein the first edge is opposite the second edge across a width of the sheet;

(b) heating the feedstock using a transverse flux induction heating system having at least one transverse flux induction heater in the system to form a heat treated product;

(c) concomitant with the heating step (b), while the feedstock is being heated within the at least one transverse flux induction heater and passing through the transverse flux induction heating system, cooling in the heater at least one of the first edge and the second edge of the feedstock by cross-flowing at least one fluid across the at least one of the first edge and the second edge of the feedstock;

(i) wherein the at least one fluid comprises liquid water droplets generating water vapor;

(ii) wherein the cross-flowing comprises flowing parallel to a plane of the sheet toward a sheet centerline, wherein the at least one fluid is delivered from at least one nozzle positioned apart from a side surface of the sheet in a direction parallel to the plane while the feedstock is being heated within and passing through the at least one transverse flux induction heater in the transverse flux induction heating system; and (iii) wherein the cooling step (c) produces a higher heat transfer at the at least one of the first edge and the second edge compared to a center portion of the sheet.

2. The method of claim 1, wherein the at least one fluid is at least one of helium, hydrogen, or air.

3. The method of claim 1, wherein the at least one fluid is air.

4. The method of claim 3, wherein the air further comprises the liquid water droplets.

5. The method of claim 1, wherein the non-ferrous alloy is selected from the group consisting of aluminum alloys, magnesium alloys, titanium alloys, copper alloys, nickel alloys, zinc alloys and tin alloys.

6. The method of claim 5, wherein the non-ferrous alloy is an aluminum alloy selected from the group consisting of 1xxx, 2xxx, 3xxx, 4xxx, 5xxx, 6xxx, 7xxx, and 8xxx series aluminum alloys.

7. The method of claim 6, wherein the aluminum alloy is selected from the group consisting of 2xxx, 5xxx, 6xxx, and 7xxx series aluminum alloys.

8. The method of claim 1, wherein the transverse flux induction heating system comprises a plurality of transverse flux induction heaters.

9. The method of claim 8, wherein the cooling step is conducted between at least two of the plurality of transverse flux induction heaters.

10. The method of claim 8, wherein the cooling step is conducted after the feedstock is heated by at least one of the plurality of transverse flux induction heaters.

11. The method of claim 8, wherein the cooling step is conducted after the feedstock is heated by more than half of the plurality of transverse flux induction heaters.

* * * * *